United States Patent Office 3,155,520
Patented Nov. 3, 1964

3,155,520
ANIMAL HUSBANDRY METHOD AND FEEDSTUFF
Jack Ziffer, Milwaukee, Wis., assignor to Pabst Brewing Company, Chicago, Ill., a corporation of Delaware
No Drawing. Filed Feb. 29, 1960, Ser. No. 11,479
15 Claims. (Cl. 99—2)

This invention relates to improved methods in animal husbandry and to nutritionally and therapeutically beneficial animal feedstuffs containing one or more of the substances identified by the arbitrary names Phytoactin and Phytostreptin, now known by the non-proprietary names of "polyamidohygrostreptin" and "polyaminohygrostreptin," respectively.

Previously, it was known to incorporate antibacterial substances such as penicillin, bacitracin, aureomycin, and tetracycline compounds in otherwise nutritionally adequate animal diets for nutritional and therapeutic purposes. It has also been found that the response of the animal to such substances varies, and many compounds having antibacterial activity produce little or no practical benefit.

The invention is concerned with the surprising discovery that the primarily antifungal substances polyamidohygrostreptin (Phytoactin) and polyaminohygrostreptin (Phytostreptin), are both nutritionally and therapeutically beneficial when administered to animals. These substances are very effectively administered by incorporation in the animal diet, such as in solid or liquid components of or supplements to the diet.

Proceeding according to the invention, one or more of the substances Phytoactin and Phytostreptin is administered to animals in an amount sufficient to produce a nutritional or therapeutic response. The substances are advantageously incorporated in the animal diet, such as in the drinking water, or in liquid or solid components of the feed. The substances are administered in a proportion which is preferably equivalent to about 1 to 500 grams per ton of solid feed consumed by the animals. Thus, the substances may be incorporated in one or more of the materials to be ingested by the animals, preferably so that they are supplied to the animals daily at about the foregoing average rate.

It has been found that Phytoactin or Phytostreptin may often be supplied at an average rate of about 1 to 50 grams per ton to produce a maximum growth response. Somewhat higher levels may be desirable for therapeutic purposes, in the range of about 10 to 200 grams per ton of solid feed consumption. The higher levels are preferred when both nutritional and therapeutic responses are desired.

The administration of Phytoactin or Phytostreptin according to the invention has been found to produce greater weight gains in poultry, and often with a better feed efficiency. Consequently, the animals are brought to marketable weight in a shorter period of time. Therapeutic benefits are also obtained in combatting illness and reducing mortality.

Phytoactin and Phytostreptin may be employed in the form of the products obtained in their production by fermentation, in the form of a concentrate thereof, or as substantially pure material. Thus, for example, a fermentation product may be dried, and the dried fermentation whole culture may be administered as such to the animals. Alternatively, products which have been partially purified and concentrated further may be employed, such as dried filtered fermentation product, and dried solvent extracts. The materials may be admixed directly with the solid or liquid components of the diet.

In a preferred embodiment of the invention, Phytoactin or Phytostreptin may be incorporated at the rate of about 1 to 500 grams per ton of feed, in an otherwise nutritionally adequate animal feed. The feed is predominantly vegetable matter, together with various animal products, minerals, vitamins and other substances which provide a nutritionally adequate feedstuff.

In another preferred embodiment, Phytoactin or Phytostreptin may be admixed with a pharmacologically acceptable material, preferably an animal feed material which contributes to nutrition, to provide a concentrate having a standardized level of active substance. Thus, for example, vegetable components of the feed may be admixed with Phytoactin or Phytostreptin. Such concentrates preferably contain about 1 to 100 grams of Phytoactin or Phytostreptin per pound of the mixture, and they are adapted for use as additives or supplements to materials constituting the principal proportion of the animal ration. Other nutrient materials which may be blended with the active products include soya products, starch, fish meal, distillery by-products, brewery by-products, sugars, minerals and the like, and vitamins such as vitamin $B_{12}$, amino acids, and other growth-promoting factors.

The Phytoactin and Phytostreptin products may be admixed with liquid nutritional animal feed materials, either as they are supplied to the animals or in the form of concentrates to be subsequently diluted for feeding.

Instead of incorporating the active substances in such materials as the foregoing which are designed to supply the nutritional requirements of the animals, it is possible to incorporate them in the drinking water. The substances are administered in this manner at a concentration of about 1 to 200 p.p.m. In such case, it may be advantageous to include a pharmacologically acceptable suspending or dispersing agent when fermentation products or concentrates are employed. It may also be preferable to incorporate such an agent when employing Phytoactin, which is slightly soluble in water, producing an homogeneous colloidal solution. Phytostreptin is water-soluble.

In this manner, the invention provides valuable improvements in animal nutrition and therapy. The invention is especially useful in poultry husbandry, and it is also contemplated that the invention be applied to other non-ruminants such as swine. The following examples illustrate beneficial results which may be obtained by the administration of Phytoactin and Phytostreptin. It is to be understood that the invention is not limited to the examples or to the materials, proportions, conditions and procedures set forth therein.

EXAMPLE 1

A chick feeding trial was conducted in batteries wherein day-old Cornish-Arbor Acre Cross hatchery run chicks were divided into four groups of approximately equal average weight, 30 chickens per group, with one group receiving only the predominantly vegetable basal chick ration (Table I), and the remaining groups receiving the basal ration supplemented with three levels of purified Phytoactin. The data at the end of 8 weeks are given in Table II.

*Table I*

| Ingredients, percent by weight |
|---|
| Ground yellow corn _____ 48.9. |
| Soybean oil meal, 44% _____ 25. |
| Corn gluten meal _____ 5. |
| Stabilized animal tallow _____ 10. |
| Dried brewers' yeast _____ 4. |
| Condensed fish solubles _____ 3. |
| Limestone _____ 1.25. |
| Alfalfa leaf meal, 17% _____ 1. |
| Steamed bone meal _____ 1. |
| Iodized salt _____ 0.5. |

Table 1—Continued

| | Ingredients, percent by weight |
|---|---|
| Vitamin A (4000 units/gm.) and Vitamin D (750 units/gm.) supplement | 0.2. |
| Riboflavin, calcium pantothenate, choline, niacin supplement [1] | 0.1. |
| Vitamin $B_{12}$ supplement [2] | 0.08. |
| DL-methionine | 0.05. |
| Manganese sulfate | 0.03. |
| Diphenyl-p-phenylene diamine | 0.02. |
| Vitamin E acetate | 55 mg./100 lbs. |
| Menadione | 110 mg./100 lbs. |

[1] Supplement contains 2 gms. riboflavin, 5 gms. calcium pantothenate, 50 gms. choline chloride and 12.5 gms. niacin per pound.
[2] Supplement contains 6 mg. vitamin $B_{12}$ per pound.

Table II

| Supplement added | Equivalent Phytoactin activity, gms. per ton feed | Average chick weights (gms.) | Average chick weight gains (gms.) | Average feed efficiency |
|---|---|---|---|---|
| Basal ration only | | 1,293 | 1,249 | 2.32 |
| Purified Phytoactin | 2 | 1,356 | 1,313 | 2.28 |
| Purified Phytoactin | 10 | 1,369 | 1,325 | 2.32 |
| Purified Phytoactin | 25 | 1,353 | 1,310 | 2.20 |

EXAMPLE 2

A chick feeding trial was conducted in batteries wherein day-old Vantress hatchery run chicks were divided into two groups, 21 chicks per group, with one group receiving only the basal ration (Table III), and the remaining group receiving the basal ration supplemented with Phytoactin dried fermentation whole culture (D.F.W.C., 4.54 gms. Phytoactin per pound). The data at the end of 8 weeks are given in Table IV.

Table III

| | Ingredients, percent by weight |
|---|---|
| Ground yellow corn | 48.9. |
| Soybean oil meal, 44% | 25.0. |
| Corn gluten meal | 10.0. |
| Stabilized animal tallow | 5.0. |
| Dried brewers' yeast | 4.0. |
| Condensed fish solubles | 3.0. |
| Limestone | 1.25. |
| Alfalfa leaf meal, 17% | 1.0. |
| Steamed bone meal | 1.0. |
| Iodized salt | 0.5. |
| Vitamin A (4000 units/gm.) and Vitamin D (750 units/gm.) supplement | 0.2. |
| Riboflavin, calcium pantothenate, choline, niacin supplement [1] | 0.1. |
| Vitamin $B_{12}$ supplement [2] | 0.08. |
| DL-methionine | 0.05. |
| Manganese sulfate | 0.03. |
| Vitamin E acetate | 55 mg./100 lbs. |
| Menadione | 110 mg./100 lbs. |

[1] Supplement contains 2 gms. riboflavin, 5 gms. calcium pantothenate, 50 gms. choline chloride and 12.5 gms. niacin per pound.
[2] Supplement contains 6 mg. vitamin $B_{12}$ per pound.

Table IV

| Supplement added | Equivalent Phytoactin activity, gms. per ton feed | Average chick weights (gms.) | Average chick weight gains (gms.) | Average feed efficiency |
|---|---|---|---|---|
| Basal ration only | | 1,225 | 1,181 | 2.38 |
| Phytoactin, D.F.W.C. | 10 | 1,275 | 1,230 | 2.43 |

EXAMPLE 3

A chick feeding trial was conducted in batteries wherein day-old, sexed male New Hampshire chicks were divided into four groups of approximately equal average weight, 20 chickens per group, with one group receiving only the basal ration (Table V), and the remaining groups receiving the basal ration supplemented with Phytostreptin dried fermentation whole culture (11 gms. Phytostreptin per pound). The data at the end of 8 weeks are given in Table VI.

Table V

| | | Per 100 lbs. |
|---|---|---|
| Ground yellow corn | lbs | 43 |
| Soybean oil meal, 44% | lbs | 32.5 |
| Wheat bran | lbs | 5 |
| Wheat middlings | lbs | 5 |
| Dehydrated alfalfa meal, 17% | lbs | 5 |
| Steamed bone meal | lbs | 2 |
| Ground limestone | lbs | 2 |
| Granite grit | lbs | 2 |
| Salt | lb | 0.5 |
| Fish meal | lbs | 3 |
| Manganese sulfate | gms | 15 |
| Vitamins: | | |
| Riboflavin | mg/lb | 0.5 |
| Vitamin D-3 | units/lb | 133 |
| Vitamin A | units/lb | 2000 |
| Choline | gm/lb | 0.12 |
| Vitamin $B_{12}$ | mcg/lb | 13.6 |

Table VI

| Supplement added | Equivalent Phytostreptin activity, gms. per ton feed | Average chick weight, gms. | Average feed efficiency |
|---|---|---|---|
| Basal ration only | | 842 | 3.13 |
| Phytostreptin, D.F.W.C. | 5 | 864 | 2.78 |
| Phytostreptin, D.F.W.C. | 10 | 879 | 2.83 |
| Phytostreptin, D.F.W.C. | 100 | 847 | 2.86 |

EXAMPLE 4

A chick feeding trial was conducted in batteries wherein day-old White Rock hatchery chicks were divided into two groups, 30 chicks per group, with one group receiving only the basal ration (Table III), and the remaining group receiving the basal ration supplemented with Phytostreptin dried fermentation whole culture (11.4 gm. Phytostreptin per pound). The data at the end of 8 weeks are given in Table VII.

Table VII

| Supplement added | Equivalent Phytostreptin activity, gms. per ton feed | Average chick weight, gms. | Average chick weight gains, gms. | Average feed efficiency |
|---|---|---|---|---|
| Basal ration only | | 1,223 | 1,183 | 2.38 |
| Phytostreptin, D.F.W.C. | 10 | 1,285 | 1,245 | 2.37 |

EXAMPLE 5

A chick feeding trial was conducted in broiler houses, wherein day-old White Vantress males × Nichols 12 females hatchery run chicks were divided into four groups, 150 chicks per group, with one group receiving the basal chick ration (Table VIII), another group receiving the basal ration supplemented with a mixture of penicillin, aureomycin, bacitracin and terramycin, and another group receiving the basal ration plus the mixture of penicillin, aureomycin, bacitracin and terramycin, supplemented with purified Phytoactin. The data obtained at the end of 12 weeks are shown in Table IX.

Table VIII

|  | Percent | |
|---|---|---|
|  | 0-6 Weeks | 6-12 Weeks |
| Ground yellow corn | 23 | 30 |
| Ground milo | 22.5 | 22.5 |
| Soybean meal | 39.5 | 32.5 |
| Corn gluten meal | 5 | 5 |
| Mineral mix [1] | 4 | 4 |
| Vitamin-antibiotic mix [2] | 1 | 1 |
| Marco B-75 | 5 | 5 |

[1] Mineral mix contains 35.53% ground limestone, 60.91% Dikal (23% calcium and 18% phosphorous), 3.05% salt and 0.51% Techmangan.
[2] 1% of vitamin-antibiotic mix will fortify each pound of feed with the following ingredients:

| | | |
|---|---|---|
| Riboflavin | mgs | 2 |
| Calcium pantothenate | do | 5 |
| Niacin | mcgs | 12.5 |
| Vitamin B₁₂ | do | 5 |
| Choline | mgs | 400 |
| Dry vitamin A | I.U. | 2,270 |
| Vitamin D₃ | I.C.U. | 680 |
| B.H.T. (Butylated hydroxy toluene) | mgs | 57 |
| Nicarbazin (25%) | do | 227 |
| Methionine | do | 454 |
| Xanthophyll oil | do | 681 |

Table IX

| Supplement added | Phytoactin activity, gms. per ton feed | Average chick wts., gms. | Average feed efficiency | Percent Mortality |
|---|---|---|---|---|
| Basal control | 0 | 1,498 | 3.04 | 17.0 |
| Basal + mixture of penicillin, aureomycin, bacitracin and terramycin* | 0 | 1,535 | 2.82 | 11.0 |
| Basal + mixture of penicillin, aureomycin, bacitracin and terramycin* + purified Phytoactin | 50 | 1,511 | 2.90 | 6.7 |

*Penicillin, 4 gm./ton feed. Bacitracin, 10 gm./ton feed. Aureomycin, 10 gm./ton feed. Terramycin, 10 gm./ton feed.

EXAMPLE 6

3000 White Rock Cross chicks being fed a typical commercial broiler ration were six weeks old when hemorrhagic complex was diagnosed. The birds reduced their consumption of feed and their droppings became very wet. The chicks were then fed 3200 pounds of feed containing 200 grams (125 gms. per ton) of Phytoactin activity (supplied as Phytoactin dried fermentation whole culture, 5 grams Phytoactin per pound). Within 3-4 days the droppings started to dry up, and by the end of one week the birds were back to normal feed consumption.

EXAMPLE 7

A turkey disease infection trial was conducted wherein day-old White Cross poults were divided into groups of approximately equal average weight, 16 poults per group, with two control groups receiving a practical type commercial ration and the remaining groups receiving the ration supplemented with varying amounts of purified Phytoactin. The poults except for one control group were then orally inoculated with 0.4 ml. of 25 times the density of a No. 1 McFarland suspension of a 24 hour culture of *Candida albicans* according to the indicated schedule. The *Candida albicans* culture had been previously isolated from a natural infection outbreak on a Minnesota farm, and was grown on Mycophil agar. At the end of 3 weeks, the poults were destroyed and examined grossly and bacteriologically. All of the inoculated birds had Candida in the crop. The data obtained are given in Table X.

Table X

| Group | Inoculated with *Candida albicans* | Phytoactin, gms./ton | Data at end of 3 weeks | |
|---|---|---|---|---|
| | | | Average poult weight (gms.) | No. of birds having Candida crop lesions |
| 1 | | 0 | 259 | 0 |
| 2 | + | 0 | 261 | 8 |
| 3 | + | 10 | 254 | 2 |
| 4 | + | 50 | 272 | 0 |
| 5 | + | 100 | 296 | 0 |

The characteristics of the antifungals Phytoactin and Phytostreptin which are employed in the invention, and their production by fermentation are described in my copending applications with Bennett, Cairney and Chow, Phytoactin and Production Thereof, Serial No. 7,064, filed February 5, 1960, now U.S. Patent 3,032,471, and Phytostreptin and Production Thereof, Serial No. 6,979, filed February 5, 1960, now U.S. Patent 3,032,470, respectively, the disclosures of which are incorporated herein by reference to avoid excessive repetition. These applications are continuations-in-part of, respectively, the patent applications Serial No. 628,769, filed December 17, 1956, and Serial No. 659,818, filed May 17, 1957. The antifungals and their production are also characterized in the following description.

PHYTOACTIN

Phytoactin is a polypeptide having no terminal free amino group as indicated below by its chemical and physical properties. It is a very light tan solid and is soluble in methanol, ethanol, isopropanol, n-butanol, chloroform, acetone, methylisobutyl ketone, dioxane, tetrahydrofuran, formamide, ethylene chloride and 1 N NaOH. It is insoluble in petroleum ether (30–60° C.), benzene, and ethyl acetate, and slightly soluble in diethyl ether, 1 N HCl, and water.

Phytoactin gives a positive permanganate test, and negative anthrone, ferric chloride, Molisch and ninhydrin tests. It gives no color with cold concentrated sulfuric acid. It is precipitated from aqueous methanol solutions by ammonium sulfate, calcium chloride, cupric chloride, lead acetate, mercuric chloride, sodium chloride, zinc chloride, picric acid, salicylic acid, phosphotungstic acid, trichloroacetic acid, methyl orange and reinecke salt.

Phytoactin also gives a positive biuret test, and negative Millon, Liebermann Buchard, Maltol, Pauly, Ehrlich (dimethylaminobenzaldehyde), and Sakaguchi tests.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycine and serine were identified.

Phytoactin (methanol solution) is heat stable, unchanged after heating for 7 days at 40° C. or for 3 hours at 65° C. It is dialyzable through a cellophane membrane (30% aqueous methanol). It is not digested by pepsin, trypsin, Pabst purified *Bacillus subtilis* bacterial protease or Pabst purified *Aspergillus oryzae* fungal protease. Phytoactin exhibits strong end absorption in the lower regions of the ultra-violet with no significant maxima in the region 230–410 mµ. Determinations were made in methanol (100 µg./ml.) with a Beckman DU spectrophotometer.

Phytoactin shows a number of characteristic absorption bands in the infrared region when dissolved in chloroform, the more significant of which are at the following frequencies (expressed in microns): 2.92, 3.04, 3.38, 3.43, 3.48, 5.72, 6.03, 6.54, 6.87, 7.06, 7.23, 7.56, 7.72, 7.80, 8.05 8.24, 8.68, 9.39, 9.43, 10.07, 10.30, 10.72, 10.80 and 11.00. The spectrum was obtained on a Perkin-Elmer Model 21, doublebeam infrared spectrophotometer, Serial No. 760 (gain 5.0, response 1.0, speed 5.0, suppression 3.0).

In order to eliminate the absorption of the chloroform solvent, the infrared absorption spectrum of phytoactin was also obtained in a potassium bromide pellet, on a Baird Model 455 I.R. spectrophotometer. There is relatively little change from the determination in chloroform solution. Phytoactin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at 6.0–6.07 (1670–1640), 6.83–6.90 (1470–1450), 7.20–7.35 (1390–1360), 7.57–7.93 (1320–1260), and 9.25–9.43 (1080–1060) (very weak).

Phytoactin is optically active; laevo rotatory, $(\alpha)_D^{25}$ $-86°$ (c.=1, methanol). The following electrometric titration data were obtained (titration started from acid range):

| Solvent | pK | Equivalent Weight | Remarks |
|---|---|---|---|
| Water | 2.4 | 400 to 500 grams/mole | No free amino group. |
| 70% methanol | 3.4 | 3,000 grams/mole | Do. |

Phytoactin exhibits an indefinite melting point, commencing at about 150° C. and melting with apparent decomposition. Melting ranges were determined in a sealed capillary in an oil bath, as follows: 154–162° C., 148–168° C., and 148–171° C.

Elemental analysis of Phytoactin gave the following values:

| C | H | N |
|---|---|---|
| 56.48 | 8.28 | 12.46 |
| 56.71 | 8.28 | 12.24 |
| 57.12 | 8.11 | 12.57 |
| 57.14 | 8.34 | 12.57 |
| [1] 56.86 | [1] 8.25 | [1] 12.46 |

[1] Average.

Amide nitrogen was found to be 0.9%. Sulfur and halogen are absent.

The molecular weight of Phytoactin has been determined to be 46,000 (plus or minus 10%) by the Ehrenberg modification of the Archibald method for the approach to sedimentation equilibrium. Two ultracentrifuge determinations were made, in pH 7.2, 0.01 molar "tris" buffer with 0.05 molar NaCl added as a supporting electrolyte. Phytoactin obtained as described herein satisfied the first criterion for ultracentrifugal homogeneity in "velocity ultracentrifuge" experiments. The material gave only one sedimenting boundary, which remained symmetrical throughout the experiments.

Phytoactin was examined by one-dimensional paper chromatography using Whatman No. 1 paper and the solvent systems indicated in Table I. The developed chromatograms were air dried at room temperature and bioautographed on agar plates seeded with *Glomerella cingulata*.

Table I.—Chromatographic Data for Phytoactin

| System | $R_f$ | Remarks | Running time, hrs. |
|---|---|---|---|
| Water saturated n-butanol | 0.96 | Well defined spot | 16 |
| n-Butanol-acetic acid-water (2-1-1). | 0.94 | do | 16 |
| n-Butanol-pyridine-water (1-0.6-1). | 0.97 | do | 16 |
| 3% aqueous ammonium chloride. | 0.02 | do | 4 |
| 50% aqueous acetone | 0.52 | Tailing | 6 |
|  | 0.94 | Well defined spot |  |
| Benzene-acetic acid-water (2-2-1, organic phase). | 0.18 | Tailing | 16 |
| Tert. butanol-acetic acid-water (74-3-25). | 0.89 | Well defined spot | 28 |

The chromatographic data for Phytoactin is consistent with the unusual solubility of this polypeptide compound in such fat-solvents as acetone, methylisobutylketone, and chloroform.

Phytoactin is particularly effective against fungi. It also has antibacterial properties. Its in vitro spectrum against a number of fungi and bacteria is shown in Table II. These tests were run in slant tubes using agar media containing various concentrations of the antibiotic in the range of 0.01 to 197 micrograms per ml. Potato dextrose agar was used for all of the fungal cultures. Penassay seed agar was used for *Candida albicans* and the bacterial cultures. Sabouraud maltose agar was used for the dermatophytes *Epidermophyton floccosum*, *Microsporum gypseum*, and *Trichophyton mentagrophytes*. The agar media were inoculated with the respective test organism and incubated at 28° C., until the control tube, containing no antibiotic, showed good growth (approximately 2–4 days for the fungal cultures and 1 day for *C. albicans* and the bacterial cultures). The inhibiting concentration of Phytoactin for each of these organisms was then noted. The incubation period was then continued for four days and two additional inhibition readings made; at two days and four days respectively (after the initial reading). One culture, *Endoconidiophora fagacearum* (*Ceratocystis fagacearum*), the causative agent of oak wilt, was incubated for an additional four week period with no change in the inhibitory level of phytoactin (0.3 μg. per ml.). Attempts to isolate *E. fagacearum* (*C. fagacearum*) from the inhibited levels were unsuccessful. Another culture, *Ceratostomella ulmi* (*Ceratocystis ulmi*) the causative agent of Dutch elm disease, was also incubated for an additional four week period with no change in the inhibiting level of Phytoactin (0.8 μg. per ml.). Attempts to isolate *C. ulmi* from the inhibited levels were unsuccessful.

Table II.—In Vitro Antimicrobial Spectrum of Phytoactin

| Culture | Culture inhibited at indicated concentration (μg./ml.) | | |
|---|---|---|---|
|  | After initial growth [2] | 2 days later | 4 days later |
| *Alternaria dianthi* | 0.8 | 2.4 | 7.3 |
| *Alternaria solani* | 0.8 | 0.8 | 0.8 |
| *Botrytis gladiolorum* | 2.4 | 2.4 | 2.4 |
| *Botrytis cinerea* | 0.8 | 2.4 | 2.4 |
| *Ceratostomella ulmi* (*Ceratocystis ulmi*) | 0.8 | 0.8 | 0.8 |
| *Colletotrichum circinans* | 0.8 | 0.8 | 0.8 |
| *Diplodia zeae* | 0.8 | 2.4 | 7.3 |
| *Endoconidiophora fagacearum* (*Ceratocystis fagacearum*) | 0.3 | 0.3 | 0.3 |
| *Endoconidiophora fimbriata* (*Ceratocystis fimbriata*) | 0.8 | 0.8 | 0.8 |
| *Endothia parasitica* | 0.8 | 0.8 | 2.4 |
| *Fusarium oxy.* f. *dianthi 5A* | 2.4 | [1] 2.4–197 | [1] 2.4–197 |
| *Fusarium oxy.* f. *gladioli* | 0.8 | 7.3 | 2.4–197 [1] |
| *Fusarium roseum* | 2.4 | 7.3 | 7.3 |
| *Gibberella zeae* | 7.3 | [1] 22–197 | [3] >197 |
| *Glomerella cingulata* | 0.3 | 0.8 | 0.8 |
| *Helminthosporium sativum* | 0.8 | 0.8 | 0.8 |
| *Helminthosporium victoria* | 0.8 | 0.8 | 0.8 |
| *Macrophominia phaseoli* | 2.4 | 2.4 | 2.4 |
| *Phytophthora cinnamomi* | 7.3 | [1] 22–197 | [1] 22–197 |
| *Pythium sp. No.* 389 | 2.4 | 22 | 22 |
| *Rhizoctonia solani* | 2.4 | 2.4 | 2.4 |
| *Sclerotina fructicola* | 0.8 | 0.8 | 0.8 |
| *Ustilago sphaerogena* | 2.4 | 2.4 | 2.4 |
| *Verticillium albo-atrum* | 0.8 | 2.4 | 2.4 |
| *Candida albicans* | 2.4 | 2.4 | 2.4 |
| *Epidermophyton floccosum* | 0.8 | 0.8 | 2.4 |
| *Microsporum gypseum* | 2.4 | 2.4 | 2.4 |
| *Trichophyton mentagrophytes* | 0.8 | 0.8 | 0.8 |
| *Bacillus cereus* | 7.3 | 22 | 22 |
| *Bacillus cereus* var. *myocides* | 7.3 | 22 | 22 |
| *Bacillus megatherium* | 7.3 | 7.3 | 7.3 |
| *Bacillus subtilis* | 22 | 22 | 22 |
| *Escherichia coli* | [3] >197 | >197 | >197 |
| *Micrococcus flavus* | 2.4 | 2.4 | 2.4 |
| *Micrococcus pyogenes* var. *aureus* | 7.3 | 22 | 22 |
| *Mycobacterium tuberculosis* No. 607 | [3] >197 | >197 | >197 |
| *Sarcina lutea* | 7.3 | 22 | 22 |

[1] Partial inhibition of culture.
[2] Inhibition reading made when control tube shows good growth, usually 2–4 days.
[3] No inhibition at this level.

Phytoactin has been shown in greenhouse studies to be an effective fungicide for the control of plant diseases such as tomato early blight, tomato late blight, bean rust and wheat leaf rust. These diseases are caused respectively by *Alternaria solani* (Ell. and Mort.) Jones and Grout, *Phytophthora infestans* (Mont.) De Bary, *Uromyces phaseoli* (Pers.) Wint., and *Puccinia rubigo-vera* (D.C.) Wint.

Phytoactin is formed during cultivation of a microorganism of the family Streptomycetaceae, specifically, a strain of the species *Streptomyces hygroscopicus*. A culture of a microorganism strain which was isolated from domestic United States oil and produces Phytoactin has been deposited in the culture collection of the United States Department of Agriculture, Agricultural Research, Northern Utilization Research and Development Division, Peoria, Illinois, and the culture has been assigned the number NRRL 2752 in the culture collection. The strain is referred to herein as *Streptomyces hygroscopicus* NRRL 2752, or for brevity, NRRL 2752. The characteristics of this organism are as set forth in the following description.

STREPTOMYCES HYGROSCOPICUS NRRL 2752

The organism NRRL 2752 produces spiral sporophores and the slightly oval to spherical spores measure 1–1.5 microns in diameter. The growth characteristics of the organism were observed following incubation on the diagnostic media indicated below for 23 days at 28° C., and any modifications in growth characteristics which occurred after 23 days and up to 44 days at 28° C. were noted. The following growth characteristics were observed, the aerial mycelium colors being described according to Ridgeway, Color Standards and Color Nomenclature (Washington, D.C., 1912):

| | |
|---|---|
| Asparagine - glucose - meat extract agar. | Excellent growth with pallid neutral to pale neutral grey aerial mycelium. Black areas forming after 14 days, becoming moist after 30 days. Light yellow-brown reverse and light brown soluble pigment. |
| Bennett's agar | Excellent growth with colorless moist vegetative mycelium. Light yellow-brown reverse and light brown soluble pigment. |
| Corn steep liquor agar (Waksman). | Moderate growth with colorless moist vegetative mycelium. Light yellow-brown reverse with fairly strong brown soluble pigment. |
| Czapek agar (Difco) | Excellent growth with pallid to neutral grey aerial mycelium. Black areas forming after 23 days, not becoming moist after 44 days. Light yellow reverse and light brown soluble pigment. |
| Gelatin (Waksman) | Not liquefied after 9 days; liquefied after 16 days. |
| Litmus milk | White ring of growth with slight coagulation. 25% peptonization after 7 days, 60% after 14 days, 70% after 23 days, 90% after 30 days and 100% after 44 days. Milk pH 6.55 after 23 days. |
| Nitrate broth (Difco) | Reduced. |
| Oatmeal-yeast extract agar | Moderate growth with pallid mouse to light mouse grey aerial mycelium. Black areas forming after 23 days becoming moist after 30 days. |
| Potato dextrose agar | Excellent growth with pallid neutral to light neutral grey aerial mycelium. Black areas forming after 30 days not becoming moist after 44 days. Yellow reverse and light brown soluble pigment. |
| Potato plug | Poor growth with brownish vegetative mycelium. White to light grey on drying tip. |
| Starch agar (Difco) | Moderate growth with pallid mouse grey aerial mycelium. Black areas forming after 14 days, becoming moist after 23 days. Light yellow-brown reverse and light brown soluble pigment. |
| Yeast extract agar (Waksman). | Excellent growth with colorless vegetative mycelium and few white areas. Light yellow-brown reverse and light brown soluble pigment. |

The above results included the dark areas characteristic of *S. hygroscopicus*, which were exhibited on asparagine-glucose-meat extract agar, Czapek agar, oatmeal-yeast extract agar, potato dextrose agar, and starch agar. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

PHYTOSTREPTIN

Phytostreptin is a polypeptide having an apparent free amino group as indicated below by its chemical and physical properties. It is a very light tan solid and is soluble in water, 1 N sodium hydroxide (forms gel on standing), methanol, ethanol, isopropanol, n-butanol, chloroform, acetone, methylisobutyl ketone, dioxane, tetrahydrofuran, formamide, and ethylene chloride. It is slightly soluble in diethyl ether and 1 N HCl, and insoluble in petroleum ether (30°–60° C.), benzene, and ethyl acetate.

Phytostreptin gives positive permanganate and biuret tests and negative anthrone, ferric chloride, Molisch, ninhydrin, Millon, Liebermann Buchard, maltol, Pauly, Ehrlich (dimethylaminobenzaldehyde), Sakaguchi and Fehling tests. It gives no color with cold concentrated sulfuric acid. It is precipitated from aqueous solution by ammonium sulfate, calcium chloride, barium chloride, cupric chloride, sodium chloride, zinc chloride, picric aid, phosphotungstic acid, trichloroacetic acid, methyl orange and reinecke salt.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycine, and serine were identified.

Phytostreptin is heat stable; no loss of activity occurred when a methanol solution was refluxed (65° C.) for 6 hours or when 30% aqueous methanol solutions, adjusted to pH 3, 7 and 10, were heated at 85° C. for 30 minutes. It is dialyzable through a cellophane membrane (aqueous solution). It is not digested by pepsin, trypsin, Pabst purified *Bacillus subtilis* bacterial protease or Pabst purified *Aspergillus oryzae* fungal protease.

Phytostreptin exhibits strong end absorption in the lower regions of the ultraviolet with no significant maxima in the region 230–410 m$\mu$. Determinations were made in methanol (100 $\mu$g./ml.) with a Beckman DU spectrophotometer.

Phytostreptin shows a number of characteristic absorption bands in the infrared region when dissolved in chloroform, the more significant of which are at the following frequencies (expressed in microns): 2.93, 3.08, 3.20, 3.33, 3.45, 3.52, 4.12, 5.71, 5.74, 6.05, 6.15, 6.56, 6.70, 6.95, 7.12, 7.60, 7.76, 7.86, 8.12, 8.86, 9.05, 9.42, 10.06, 10.34, 10.80, 11.00, 11.46, 11.70 and 13.30. The spectrum was obtained on a Perkin-Elmer Model 21, double-beam infrared spectrophotometer, Serial No. 760 (gain 5.0, response 1.0, speed 6.0 and suppression 3.0).

In order to eliminate the absorption of the chloroform solvent, the infrared absorption spectrum of phytostreptin was also obtained in a potassium bromide pellet, on a Baird Model 455 I.R. spectrophotometer. There is relatively little change from the determination in chloroform solution. Phytostreptin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at: 6.0–6.07 (1670–1640), 6.83–6.90 (1470–1450), 7.20–7.35 (1390–1360) (shoulder), 7.57–7.93 (1320–1260), and 8.77–9.43 (1140–1060).

Phytostreptin is optically active; laevo rotatory $[\alpha]_D^{26}$ —81° (c.=1, methanol). The following electrometric titration data were obtained (titration started from acid range):

| Solvent | pK | Equivalent weight, grams/mole | Remarks |
|---|---|---|---|
| Water | 2.4 | 1,000 | Apparent free carboxyl group. |
|  | 9.6 | 3,500 | Apparent free amino group. |
| 70% Methanol | 3.4 | 2,300 | Apparent free carboxyl group. |
|  | 9.4 | 3,300 | Apparent free amino group. |

Phytostreptin exhibits an indefinite melting point, commencing at about 165° C. and melting with apparent decomposition. Melting ranges were determined in a sealed capillary in an oil bath, as follows: 168–178° C., 166–172° C., and 166–173° C.

Elemental analysis of phytostreptin gave the following values:

| C | H | N |
|---|---|---|
| 52.56 | 7.93 | 13.53 |
| 52.44 | 7.66 | 13.26 |
| 53.70 | 8.44 | 13.38 |
| 53.45 | 8.29 | 13.48 |
| [1] 53.04 | [1] 8.03 | [1] 13.41 |

[1] Average.

Amide nitrogen was found to be 1.5%. Sulfur and halogen are absent.

The molecular weight of phytostreptin has been determined to be 28,600 (plus or minus 10%) by the Ehrenberg modification of the Archibald method for the approach to sedimentation equilibrium. Two ultracentrifuge determinations were made in pH 7.2, 0.01 molar "tris" buffer with 0.05 molar NaCl added as a supporting electrolyte. Phytostreptin obtained as described herein satisfied the first criterion for ultracentrifugal homogeneity in "velocity ultracentrifuge" experiments. The material gave only one sedimenting boundary, which remained symmetrical throughout the experiments.

Phytostreptin was examined by ascending one-dimensional paper chromatography using Whatman No. 1 paper and the solvent systems indicated in Table III. The developed chromatograms were air dried at room temperature and bioautographed on agar plates seeded with *Glomerella cingulata*.

Table III.—*Chromatographic Data for Phytostreptin*

| System | Rf | Remarks | Running time, hours |
|---|---|---|---|
| Water saturated with n-butanol | 0.60 | Well defined spot | 7 |
| n-Butanol saturated with water | 0.91 | do | 16 |
| n-Butanol-acetic acid-water (2-1-1) | 0.93 | do | 16 |
| n-Butanol-pyridine-water (1-0.7-1) | 0.92 | do | 16 |
| 3% aqueous ammonium chloride | 0.60 | do | 4 |
| 50% aqueous acetone | 0.53 | Tailing | 6 |
|  | 0.93 | Well defined spot |  |
| Tert. butanol-acetic acid-water (74-3-25) | 0.91 | do | 2 |
| n-Butanol-methanol-water (4-1-2) | 0.93 | do | 8 |
| Benzene-methanol (4-1) | 0.93 | do | 5 |

The chromatographic data for phytostreptin is consistent with the unusual solubility of this polypeptide compound in such fat solvents as acetone, methylisobutylketone, and chloroform.

Phytostreptin forms alkali metal salts such as the sodium salt with alkali metal bases, and other simple and complex salts of phytostreptin can readily be prepared. Phytostreptin salts include the copper, zinc and manganese salts, and the molybdate, picrate, helianthate and reineckate complex salts. These salts are slightly soluble or soluble in water, 1 N sodium hydroxide, and chloroform. They are slightly soluble in 1 N HCl, and soluble in methanol and acetone. The salts are active against the test organism *Glomerella cingulata*.

Phytostreptin is particularly effective against fungi. It also has antibacterial properties. Its in vitro spectrum against a number of fungi and bacteria is shown in Table IV. In addition, in a paper disc-agar plate assay test using potato dextrose agar, phytostreptin developed zones of inhibition against *Ceratostomella ulmi* (*Ceratocystis ulmi*), the causative agent of Dutch elm disease, at about 40 micrograms per milliliter.

The tests reported in Table IV were made in agar slant tubes using agar media containing various concentrations of phytostreptin in the range of 0.01 to 197 micrograms per ml. The same procedures were used as previously described for phytoactin in connection with Table II. One culture, *Endoconidiophora fagacearum* (*ceratocystis fagaceaurm*), the causative agent of oak wilt, was incubated for an additional four week period with no change in the inhibitory level of phytostreptin (0.3 microgram ($\mu$g.) per milliliter). Attempts to isolate *E. fagacearum* (*C. fagacearum*) from the inhibited levels were unsuccessful.

Table IV.—*In Vitro Antimicrobial Spectrum of Phytostreptin*

| Culture | Culture inhibited at indicated concentration ($\mu$g./ml.) | | |
|---|---|---|---|
|  | After initial growth [2] | 2 days later | 4 days later |
| *Alternaria dianthi* | 2.4 | 2.4 | 2.4 |
| *Alternaria solani* | 0.8 | 0.8 | 0.8 |
| *Botrytis gladiolorum* | 0.8 | 0.8 | 2.4 |
| *Botrytis cinerea* | 2.4 | 2.4 | 2.4 |
| *Colletotrichum circinans* | 0.8 | 2.4 | 2.4 |
| *Diplodia zeae* | 2.4 | 2.4 | 2.4 |
| *Endoconidiophora fagacearum* (*Ceratocystis fagacearum*) | 0.3 | 0.3 | 0.3 |
| *Endoconidiophora fimbriata* (*Ceratocystis fimbriata*) | 0.8 | 0.8 | 0.8 |
| *Endothia parasitica* | 0.8 | 2.4 | 2.4 |
| *Fusarium oxy. f. dianthi 5A* | 7.3 | [1] 7.3–197 | [1] 7.3–197 |
| *Fusarium oxy. f. gladioli* | 2.4 | [1] 2.4–197 | [1] 2.4–197 |
| *Fusarium roseum* | 2.4 | 7.3 | 22 |
| *Gibberella zeae* | 7.3 | [1] 7.3–197 | [1] 22–197 |
| *Glomerella cingulata* | 0.3 | 0.8 | 2.4 |
| *Helminthosporium sativum* | 0.8 | 2.4 | 2.4 |
| *Helminthosporium victoria* | 0.8 | 0.8 | 0.8 |
| *Macrophominia phaseoli* | 2.4 | 2.4 | 2.4 |
| *Phytophthora cinnamomi* | 7.3 | [1] 7.3–197 | [1] 7.3–197 |
| *Pythium sp. No. 389* | 7.3 | 22 | 22 |
| *Sclerotina fructicola* | 0.8 | 0.8 | 2.4 |
| *Rhizoctonia solani* | 2.4 | 2.4 | [1] 2.4–197 |
| *Verticillium albo-atrum* | 0.8 | 2.4 | 2.4 |
| *Candida albicans* | 2.4 | 2.4 | 2.4 |
| *Epidermophyton floccosum* | 0.8 | 0.8 | 2.4 |
| *Microsporum gypseum* | 2.4 | 2.4 | 2.4 |
| *Trichophyton mentagrophytes* | 0.8 | 2.4 | 2.4 |
| *Bacillus cereus* | 7.3 | 22 | 22 |
| *Bacillus cereus var. mycoides* | 7.3 | 22 | 22 |
| *Bacillus megatherium* | 7.3 | 7.3 | 7.3 |
| *Bacillus subtilis* | 7.3 | 22 | 22 |
| *Escherichia coli* | [3] >197 | >197 | >197 |
| *Micrococcus flavus* | 0.3 | 2.4 | 2.4 |
| *Micrococcus pyogenes var. aureus* | 2.4 | 7.3 | 7.3 |
| *Mycobacterium tuberculosis No. 607* | [3] >197 | >197 | >197 |
| *Sarcina lutea* | 2.4 | 2.4 | 2.4 |

[1] Partial inhibition of culture.
[2] Inhibition readings made when control tube showed good growth, usually 1–4 days.
[3] No inhibition at this level.

Phytostreptin and the above simple and complex salts have been shown in greenhouse studies to be an effective fungicide for the control of plant diseases such as tomato early blight, tomato late blight, and bean rust. These diseases are caused respectively by *Alternaria solani* (Ell. and Mort.) Jones and Grout, *Phytophthora infestans* (Mont.) De Bary, and *Uromyces phaseoli* (Pers.) Wint.

Phytoactin and phytostreptin closely resemble each other in their characteristics and properties, yet they are readily distinguished by their properties of water solubility, elemental analysis, molecular weight, percent of amide nitrogen, infrared spectrum, and electrometric titration.

Both of the antifungals are clearly distinct from the other antifungal antibacterial antibiotics previously reported.

Phytostreptin is likewise produced by cultivation of a member of the family Streptomycetaceae, specifically, a strain of the species *Streptomyces hygroscopicus*. A culture of a strain of a microorganism which was isolated from domestic United States soil and which produces phytostreptin has been deposited in the above culture collection and assigned the number NRRL 2751. The characteristics of the strain NRRL 2751 closely resemble those of the strain NRRL 2752. There are, however, morphological and biochemical characteristics that distinguish the two microorganisms, notably, a marked difference in the rate of peptonization of milk. Darker aerial mycelium are also formed by NRRL 2752 on a number of media. A description of the organism NRRL 2751 follows:

STREPTOMYCES HYGROSCOPICUS NRRL 2751

The organism NRRL 2751 produces spiral sporophores and the slightly oval to spherical spores measure 1–1.3 microns in diameter. The growth characteristics of the organism were observed following incubation on the media indicated for 23 days at 28° C., and any modifications in growth characteristics which occurred after 23 days and up to 44 days at 28° C. were noted. The following growth characteristics were observed, the aerial mycelium colors being described according to Ridgeway, supra.

| | |
|---|---|
| Asparagine-glucose-meat extract agar. | Excellent growth with neutral grey aerial mycelium. Light yellow-brown reverse and light brown soluble pigment. |
| Bennett's agar | Excellent growth with colorless dry vegetative mycelium. Light yellow-brown reverse and light brown soluble pigment. |
| Corn steep liquor agar (Waksman). | Excellent growth with colorless, dry (moist after 7 days), wrinkled vegetative mycelium. Sparse white aerial mycelium forming after 30 days. Light yellow-brown reverse with fairly strong brown soluble pigment. |
| Czapek agar (Difco) | Excellent growth with pallid to pale neutral grey aerial mycelium. Black areas forming after 30 days, not becoming moist after 44 days. Light yellow reverse and light brown soluble pigment. |
| Gelatin (Waksman) | Liquefied after 9 days. |
| Litmus milk | Colorless to white ring of growth with no coagulation. No peptonization after 7 days, 100% after 14 days. Milk pH 6.6 after 23 days. |
| Nitrate broth (Difco) | Reduced. |
| Oatmeal-yeast extract agar. | Excellent growth with neutral grey aerial mycelium. Black areas forming after 30 days, not becoming moist after 44 days. |
| Potato dextrose agar | Excellent growth with light neutral to neutral grey aerial mycelium. Yellow-brown reverse and light brown soluble pigment. |
| Potato plug | Poor growth with colorless vegetative mycelium. White to light grey on drying tip. Black areas forming in butt after 44 days. |
| Starch agar (Difco) | Excellent growth with mouse grey aerial mycelium. Light yellow-brown reverse and faint brown soluble pigment. |
| Yeast extract agar (Waksman). | Excellent growth with pale smoke grey aerial mycelium. Dark grey areas forming after 30 days, not becoming moist after 44 days. Light yellow-brown reverse and light brown soluble pigment. |

The above results included the dark areas characteristic of *S. hygroscopicus*, which were exhibited on Czapek agar, oatmeal-yeast extract agar, potato plug, and yeast extract agar. In addition, the organism showed moist black areas on year-old refrigerated starch agar slants. The organism also produced the characteristic grey-colored aerial mycelium on a number of the media, and the characteristic compact spore-bearing hyphae were produced on agar media such as asparagin-glucose-meat extract agar, potato dextrose agar, and oatmeal-yeast extract agar.

PRODUCTION OF ANTIFUNGALS BY FERMENTATION

The antifungals are produced by fermenting a nutrient medium with a phytoactin or phytostreptin producing microorganism such as *Streptomyces hygroscopicus* NRRL 2752 or 2751, respectively. Preferably, an aqueous nutrient medium is fermented under submerged, aerobic and agitated conditions until substantial antifungal activity is produced. The antifungals may be routinely determined by the agar plate assay method, using *Glomerella cingulata* or *Candida albicans* as the test organism.

Nutrient media which are suitable for the production of the antifungal include a suitable source of assimilable carbon, preferably a carbohydrate source such as glucose, a source of assimilable nitrogen such as soya flour, corn steep liquor, yeast and the like, and mineral salts, which may be present with the other ingredients, such as corn steep liquor. Inoculum of the organism is prepared by growing it on agar slant media such as oatmeal or peptone-yeast extract. These agar slant cultures can then be used to prepare larger amounts of inoculum by seeding shake flasks containing such media as soya flour and corn steep liquor. These flasks are shaken under conditions suitable for the growth of the organism. The shake flask cultures can then be used for the preparation of larger amounts of inoculum or, alternatively, they may be used to seed the fermentors directly. Aseptic conditions must be maintained during the preparation of the inoculum and during the subsequent fermentation.

In the fermentation, the desired media is prepared and the pH of the medium adjusted to about 6.3–7.5, preferably 6.7–7.2. Calcium carbonate is included in the preferred medium. The medium so prepared is sterilized by heating at an elevated temperature under pressure, i.e., at about 120° C. The medium is then cooled to a temperature of approximately 24°–36° C., preferably 27°–34° C. The sterile medium is then inoculated under aseptic conditions with the inoculum prepared as described above.

The fermentation then proceeds at a temperature in the foregoing ranges with agitation and aeration using sterile air. The fermentation period may vary with different media and different operating conditions. Air is ordinarily supplied at the rate of about 0.25–1.5 volumes of free air per volume of medium per minute. The fermentation is continued for a period of time sufficient to achieve optimal and preferably maximal production of Phytostreptin or Phytoactin as the case may be. A fermentation period of 48–96 hours is ordinarily sufficient.

The antifungal may be recovered by a number of methods or, alternatively, the whole culture or whole broth may be used as such or may be concentrated or dried by suitable means. It is ordinarily preferred to recover the antifungal by precipitation or by solvent extraction of the whole culture or whole broth. In the precipitation recovery method, the whole culture is usually filtered or centrifuged at a preferred pH range of 7–8, and the filtrate is acidified to a preferred pH range of 3–5 to precipitate the antifungal. The preferred acid for this precipitation step is hydrochloric acid, although other acids may also be used. Since the culture mycelium contains appreciable quantities of the antifungal, the whole culture (without filtration) may, alternatively, be adjusted to pH 3–5 for the precipitation step.

The activity may be recovered from the precipitate or sediment by extraction with a suitable organic liquid in which it is soluble, such as methanol, ethanol, isopropanol, butanol, acetone or methylisobutyl ketone. The solvent solution may then be evaporated in vacuo, and the resulting residue further extracted with organic solvents. In the preferred method of recovery, the latter residue after evaporation is extracted exhaustively with methylisobutyl ketone, and the solvent solution is concentrated to small volume in vacuo. The antifungal may then be precipitated by the addition of 5 volumes of diethyl ether. The antifungal remaining in the methylisobutyl ketone-ether mother liquor may be recovered by concentrating the mother liquor to small volume in vacuo and adding 5 volumes of petroleum either (30°–60° C.) to precipitate the activity. Alternatively, a solvent extract of the whole culture, whole broth or active precipitated sediment may be used as such or after concentration in vacuo without further purification.

The invention thus provides methods and compositions which are valuable additions to animal husbandry. By employing Phytoactin and Phytostreptin, increased growth and significant reductions in illness and mortality may be achieved.

The invention is hereby claimed as follows:

1. The improvement in animal husbandry which comprises administering to livestock a member selected from the group consisting of polyamidohygrostreptin and polyaminohygrostreptin.

2. The improvement in animal husbandry which comprises incorporating in the diet of livestock a member selected from the group consisting of polyamidohygrostreptin and polyaminohygrostreptin.

3. The improvement in animal husbandry which comprises incorporating in the diet of livestock a member selected from the group consisting of polyamidohygrostreptin and polyaminohygrostreptin in a proportion equivalent to 1 to 500 grams per ton of solid feed consumption.

4. The improvement in poultry raising which comprises incorporating in a poultry diet about 1 to 500 grams of polyamidohygrostreptin per ton of solid feed consumption.

5. The improvement in poultry raising which comprises incorporating in a poultry diet about 1 to 500 grams of polyaminohygrostreptin per ton of solid feed consumption.

6. An animal feedstuff comprising a nutritional animal feed material admixed with a member selected from the group consisting of polyamidohygrostreptin and polyaminohygrostreptin.

7. A poultry feedstuff comprising a nutritional poultry feed material admixed with a member selected from the group consisting of polyamidohygrostreptin and polyaminohygrostreptin.

8. An animal feedstuff comprising a predominantly vegetable solid animal feed material containing a member selected from the group consisting of polyamidohygrostreptin and polyaminohygrostreptin.

9. An animal ration comprising a nutritional solid animal feed material admixed with about 1 to 500 grams per ton of said material, of a member selected from the group consisting of polyamidohygrostreptin and polyaminohygrostreptin.

10. A poultry ration comprising a nutritional solid poultry feed material admixed with about 1 to 500 grams per ton of said material, of a member selected from the group consisting of polyamidohygrostreptin and polyaminohygrostreptin.

11. A poultry ration comprising a nutritionally adequate predominantly vegetable solid poultry feed containing about 1 to 500 grams per ton of said feed, of a member selected from the group consisting of polyamidohygrostreptin and polyaminohygrostreptin.

12. An animal feed additive comprising a nutritional animal feed material admixed with about 1 to 100 grams per pound of the mixture, of a member selected from the group consisting of polyamidohygrostreptin and polyaminohygrostreptin.

13. A poultry feed additive comprising a nutritional poultry feed material admixed with about 1 to 100 grams of polyamidohygrostreptin per pound of the mixture.

14. A poultry feed additive comprising a nutritional poultry feed material admixed with about 1 to 100 grams of polyaminohygrostreptin per pound of the mixture.

15. A poultry feed additive comprising a predominantly vegetable solid poultry feed material admixed with about 1 to 100 grams per pound of the mixture, of a member selected from the group consisting of polyamidohygrostreptin and polyaminohygrostreptin.

References Cited in the file of this patent

UNITED STATES PATENTS

| | | |
|---|---|---|
| 2,900,304 | Martin | Aug. 18, 1959 |
| 2,903,356 | Lampen et al. | Sept. 8, 1959 |
| 2,910,360 | De Zeeuw et al. | Oct. 27, 1959 |

OTHER REFERENCES

Ziffer et al.: Phytopathology, 1957, page 539.

UNITED STATES PATENT OFFICE
CERTIFICATE OF CORRECTION

Patent No. 3,155,520                                   November 3, 1964

Jack Ziffer

It is hereby certified that error appears in the above numbered patent requiring correction and that the said Letters Patent should read as corrected below.

Column 10, line 27, for "aid" read -- acid --; column 11, Table III, fourth column, line 7 thereof, for "2" read -- 28 --; column 12, line 18, for "fagaceaurm", in italics, read -- fagacearum --, in italics; column 14, line 45, for "rocovered" read -- recovered --.

Signed and sealed this 13th day of July 1965.

(SEAL)
Attest:

ERNEST W. SWIDER                               EDWARD J. BRENNER
Attesting Officer                                   Commissioner of Patents